Nov. 30, 1948.   W. C. DENISON, JR   2,455,330
HYDRAULIC APPARATUS
Filed Nov. 20, 1942   2 Sheets-Sheet 1

INVENTOR
William C. Denison Jr.
BY
Warren H. F. Schmieding
ATTORNEY

Nov. 30, 1948.        W. C. DENISON, JR            2,455,330
                       HYDRAULIC APPARATUS
Filed Nov. 20, 1942                              2 Sheets—Sheet 2

INVENTOR
William C. Denison Jr.
BY
ATTORNEY

Patented Nov. 30, 1948

2,455,330

UNITED STATES PATENT OFFICE 2,455,330

HYDRAULIC APPARATUS

William C. Denison, Jr., Delaware, Ohio

Application November 20, 1942, Serial No. 466,374

8 Claims. (Cl. 103—162)

The present invention relates to fluid transmitting devices and more particularly to pumps or motors of the hydraulic type.

One of the objects of the present invention is to insure the presence of fluid pressure, preferably lubricant under pressure, on the opposite bearing surfaces of the rotating element of a pump or motor.

Another object of the present invention is to insure fluid pressure between opposite bearing surfaces of the rotating element of a pump or motor although portions of contiguous bearing surfaces are subjected to different pressures.

More specifically the present invention is directed to a pump or motor of the type employing a rotatable cylinder barrel having axially movable pistons therein and an angularly disposed thrust plate operatively associated with the piston, i. e., the ends of the piston bear against one surface of said plate under pressure, the opposite surface of the rotating plate providing a bearing surface which is contiguous with a stationary bearing surface. And, more specifically, it is a further object of the present invention to supply fluid pressure, preferably oil under pressure, between contiguous bearing surfaces of the rotating plate and the stationary bearing.

A still further object is to insure oil pressures, between the contiguous bearing surfaces of the rotating plate and the stationary bearing, of values which balance or approximate the resultant pressures imposed between the pistons and the plate.

In carrying out the foregoing objects, it is a further object to subject the contiguous bearing surfaces of the rotating plate and the stationary bearing to the high pressure side of the pump or motor at such areas of the surfaces where the greater pressure is imposed between the pistons and rotating plate and to subject said bearing surfaces to the low pressure side of the pump or motor at such areas of the surfaces where the minimum pressure is imposed between the pistons and the rotating plate.

Further objects and advantages will be apparent from the following description, reference being had to the accompanying drawings wherein a preferred form of embodiment of the present invention is clearly shown.

Figure 1:
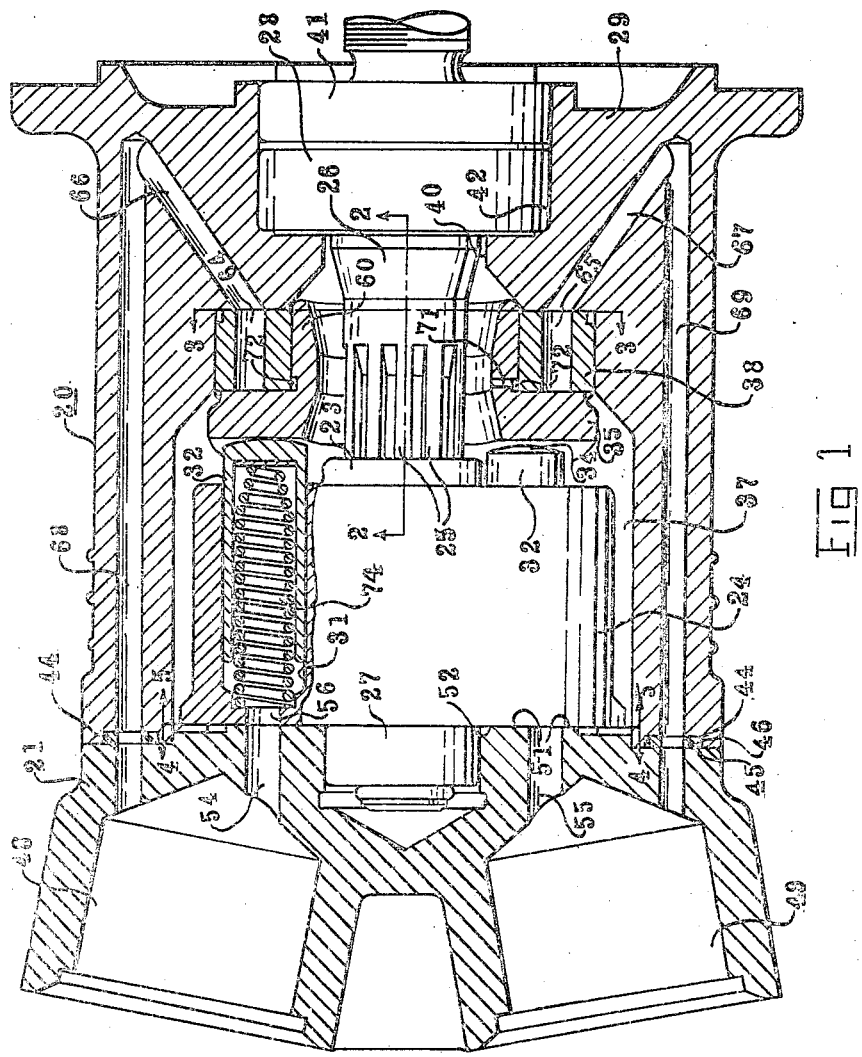
Fig. 1 is a longitudinal section view of a pump or motor but showing part of the cylinder barrel or rotor and the shaft and bearings therefor in elevation.

Referring to the drawings, the pump or motor, in general, includes a stationary housing 20 having one end thereof closed by a port or end plate 21. A rotor 23 including cylinder barrel 24 is suitably secured, as by splines 25, to a shaft 26. The shaft 26 is journalled in a ball bearing 27 in the port plate 21 and on a ball bearing 28 mounted in the end 29 of the housing opposite the port plate 21.

The cylinder barrel 24 is formed with a plurality of axially extending chambers which are in the form of cylinders 31 spaced equal distance from one another and equal distance from the axis of the barrel. Each of these cylinders 31 carries a cylindrical piston 32 which is closed at one end. The closed ends 34 of the pistons extend beyond one end of the barrel 24 and engage the rotating ring 35 of the swash plate mechanism. The rotating ring 35 is journalled on an axis at an angle to the axis of the shaft as will be more specifically described hereinafter.

More specifically, the housing 20 and port plate 21 are formed of castings. The housing 20 is formed with a large opening 37 for receiving the barrel 24, the rotating ring 35 and the bearing 38 for the ring. The opening 37 gradually diminishes in size toward the end 29 thereof and the shaft 26 extends through the neck portion 40. The ball bearing 28 and a stuffing gland 41 are housed in an opening 42 in the end 29. The end of the shaft 26 extends beyond the end 29 where it is suitably connected to a motor, if the fluid transmission device is functioning as a pump, or to a driven element, if the device is functioning as a motor.

The port plate 21 is secured to the housing 20 in any suitable manner, there being a circular groove 44 in the end 45 of housing which receives a resilient gasket ring 46 which is compressed when the port plate is secured in position and therefore forms a seal between the port plate and housing. The outer side of the port plate is provided with two chambers 48 and 49, one of which is connected to the high pressure side of a fluid system and the other is connected to the low pressure side. In the embodiment illustrated, I have chosen, for the purpose of describing my invention, to designate the chamber 48 as the high pressure chamber and 49 as the low pressure chamber. It is clearly understood by those skilled in the art that chamber 48 can be a low pressure chamber and chamber 49 the high pressure chamber.

Figure 4:
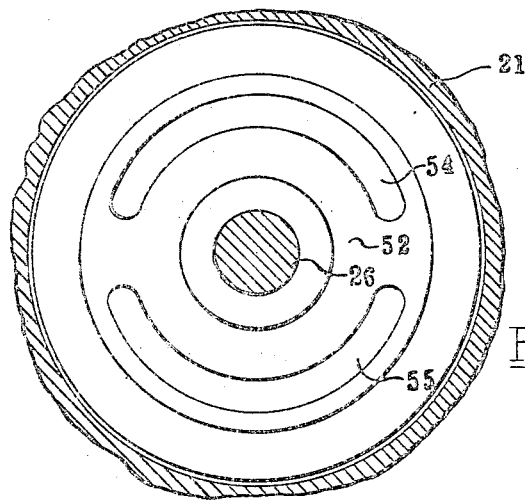
Fig. 4 is a view of the port or end plate looking in the direction of arrows 4—4 of Fig. 1.
Figure 5:
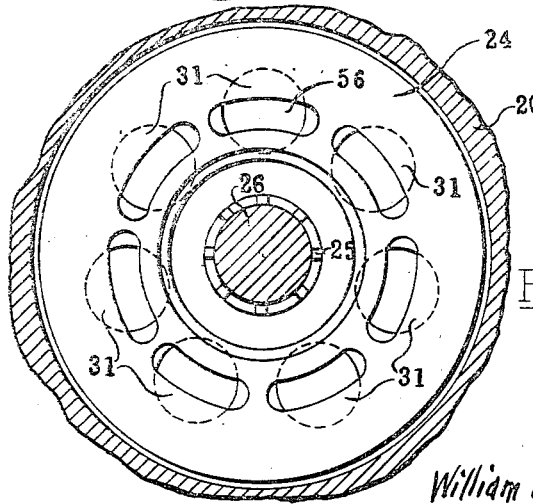
Fig. 5 is an end view of the cylinder barrel or rotor looking in the direction of arrows 5—5 of Fig. 1.

The innermost projecting part of the port plate 21 is ground and finished to form a bearing surface 51 which is contiguous with the ground and finished left end or bearing surface 52 of the barrel 24. Passages or ports 54 and 55 extend through the plate 21 and terminate at the bearing surface in the form of arcuate shape ports (see Fig. 4), the axis for the arcuate shape ports being the same as the axis of the barrel 24. Passages 54 and 55 lead to chambers 48 and 49, respectively.

The axes of the cylinders 31 of the barrel 24 are spaced from the axis of the barrel the same distance as the center of the arcuate ports 54 and 55 and each cylinder is provided with an arcuately shaped port 56 which terminates at the bearing surface 52. Each of these ports 56 is brought into alignment first with one of the ports 54 or 55 and then with the other of said latter ports when the rotor 23 is in motion.

Figure 2:
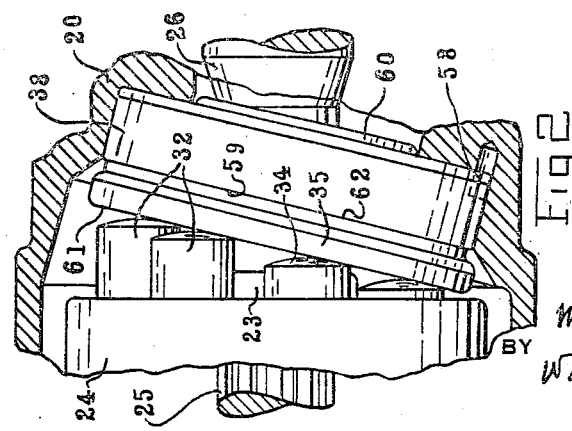
Fig. 2 is a fragmentary view partly in section and partly in elevation, the section being taken on line 2—2 of Fig. 1.
Figure 3:
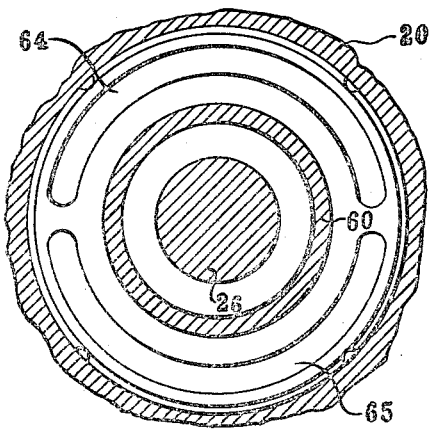
Fig. 3 is a sectional view taken on line 3—3 of Fig. 1.

The bearing 38 for the rotating ring 35 is ring shaped and the axis thereof is disposed at an oblique angle with respect to the axis of the shaft 26 as is clearly shown in Fig. 2. The ring 38 is formed preferably of bronze base material and is held stationarily by a pin or pins 58 which extend into the body of the housing 20. The side 59 of the bearing 38 facing the rotating ring 35 is ground and finished to provide a bearing surfaces. Likewise the inner periphery of the stationary ring is ground and finished to provide a bearing surface for the outer periphery of a hub 60 of rotating ring 35. The opposite sides 61 and 62 of ring 35 are ground and finished to provide bearing surfaces.

The stationary bearing ring 38 is provided with two arcuately shaped slots 64 and 65 which register, respectively, with angularly drilled holes 66 and 67 in the housing 20 and which in turn are connected with high and low pressure chambers 48 and 49 by drilled holes 68 and 69, respectively, in the housing 20, gasket 46 and port plate 21. The arcuately shaped slots 64 and 65 are disposed directly opposite the arcuately shaped ports 54 and 55, respectively, and since the slot 64 is connected directly with the high pressure chamber 48 through the passage formed by the holes 68 and 66, the hydraulic pressure impressed at the port 54, and the hydraulic pressure impressed between the surfaces at the slots 64, will be equal. Likewise, since the slot 65 is connected directly with the low pressure chamber 49 through the holes 69 and 67, the hydraulic pressure impressed at the port 55, and the hydraulic pressure impressed at the slot 65, will be equal. The length of the slots 64 and 65 and the area of the bearing surfaces are such that the resultant pressure impressed by the pistons between contiguous surfaces 59 and 62 is slightly greater than the fluid or liquid pressure between the contiguous surfaces 59 and 62 impressed through the passages 68, 66 and 64 and 69, 67 and 65 whereby the surface 62 of ring 35 is maintained, at all times, in sealing relationship with surface 59 of bearing 38. Since oil under pressure is delivered to bearing surfaces 51, 52, 59 and 62, the rotor 23 or barrel 24 and ring 35 of the swash plate mechanism, float between two thin films of oil at opposite ends thereof.

It will be observed that the ends 34 of pistons 32 are spheroidically shaped and when the barrel and pistons are rotated, the pistons cause a rotating movement to be imparted to ring 35. The points of contact of the ends 34 with the ring 35 are such that the resultant pressure on the plate 35 is at a right angle with respect to the face of the plate. In this manner, all or substantially all thrust is borne between the surfaces 62 and 59 of rings 35 and 38, respectively, the hub 60 of ring 35 functioning primarily as a guide and trunnion for the ring 35. The peripheral surface of the hub 60 will be lubricated by oil seeping inwardly between surfaces 59 and 62. A circular groove 72 is formed in the periphery of hub 60 at the junction of the surface 62 and a hole 71 connects this groove with the drain chamber in the housing so as to confine the high pressure area of the contiguous surfaces of the ring 35, and the surfaces of the bearing 38, including the inner periphery, to the area of surface 59.

Motors or pumps of this type are usually provided with a drain leading from the interior 37 of the housing 20. This drain usually leads to a supply tank. Since the interior 37 of housing 20 is on the low pressure side, oil under pressure between the contiguous bearing surfaces will seep to the interior of the housing and in this manner maintain a film of oil at all times on the bearing surfaces. Sufficient oil escapes between the moving parts to maintain the heads or ends 34 of pistons 32 and the bearing surface 61 of ring 35 well lubricated.

A spring 74 may be carried in each of the pistons 32 for the purpose of forcing the left end of barrel 24 in sealing relationship with the port plate. This, as is well known to those skilled in the art, is particularly desirable, for example, when the device is functioning as a pump.

The cost of manufacture and noise has been materially reduced. Heretofore, it has been necessary to employ one or more heavy duty ball and/or roller bearings for the thrust ring 35. Those types of bearings are costly, cumbersome and therefore require a large housing, and were relatively noisy. By providing pressure on opposite sides of the rotor and the bearing ring 35 of the swash plate, particularly in a device employing oil as a fluid, the rotor and bearing ring float between two films of lubricant with the resultant effect of materially less wear on the surface 62 of ring 35.

While the form of embodiment of the present invention as herein disclosed constitutes a preferred form, it is to be understood that other forms might be adopted, all coming within the scope of the claims which follow.

I claim:

1. A fluid pressure energy translating device comprising in combination, a casing having spaced opposed bearing surfaces, said surfaces being provided with registering ports; fluid passages in said casing establishing continuous communication between the registering ports; means disposed in said casing for rotation between said bearing surfaces, said means having a rotor with a face contacting one of said bearing surfaces, said rotor having a chamber with a port opening to said face and registering with the openings in the contacting bearing surface upon rotation of said rotor; an element disposed for reciprocation in the chamber in said rotor; and an inclined thrust member engaging said element and having a surface in contact with the other of said opposed bearing surfaces.

2. A fluid pressure energy translating device comprising in combination, a casing having spaced opposed bearing surfaces, said surfaces being provided with ports having substantially equal areas and being similarly located relative to horizontal and vertical planes passing through the longitudinal axis of said casing; fluid passages formed in said casing and establishing continuous communication between the registering ports; means disposed in said casing for rotation between said bearing surfaces, said means having a cylinder barrel with a face abutting one of said bearing surfaces, said cylinder barrel having a chamber with an outlet port opening to said face and communicating with the ports in the abutting bearing surface upon rotation of said cylinder barrel; a piston disposed for reciprocation in the chamber in said cylinder barrel; and a thrust member engaging said piston, said thrust member having a surface abutting the other of said opposed bearing surfaces.

3. A fluid pressure energy translating device comprising in combination, a casing having high and low pressure chambers; a pair of spaced oppositely facing bearing surfaces provided in said casing, said surfaces having circularly spaced registering arcuate recesses formed therein; fluid passages in said casing connecting the registering recesses with the high and low pressure chambers; means disposed for rotation in said chamber between said bearing surfaces, said means having a cylinder barrel with a face abutting one of said bearing surfaces, said cylinder barrel having a chamber with an outlet port opening to said face and communicating with the recesses in the abutting bearing surface upon rotation of said cylinder barrel; a piston disposed for reciprocation in the chamber in said cylinder barrel; and a thrust member engaging said piston, said thrust member having a surface abutting the other of said opposed bearing surfaces, portions of said thrust member surface being exposed to the fluid pressures obtaining in the recesses in said bearing surface.

4. A fluid pressure energy translating device comprising in combination, a casing having a bearing surface with inlet and outlet ports opening thereto; a cylinder barrel in said casing, the cylinders therein alternately registering with said ports upon relative rotation of said barrel and casing; piston means disposed for reciprocation in said cylinders to transfer fluid from said inlet to said outlet port; means in said casing for imparting reciprocatory movement to said pistons, said means having a rotatable thrust plate and bearing therefor, said bearing being seated in said casing and having openings in registration with said inlet and outlet ports; and passage means in said casing continuously connecting the inlet and outlet ports with the openings in said bearing registering therewith.

5. A fluid pressure energy translating device comprising in combination, a casing having a bearing surface with inlet and outlet ports opening thereto; a cylinder barrel in said casing, the cylinders therein alternately registering with said ports upon relative rotation of said barrel and casing; piston means disposed for reciprocation in said cylinders to transfer fluid from said inlet to said outlet port; means in said casing for imparting reciprocatory movement to said pistons, said means having a thrust member; bearing means between said thrust member and said casing, said bearing means having recesses formed therein in alignment with the portion of the cylinder barrel exposed to fluid pressure in said inlet and outlet ports; and, fluid conducting means formed in said casing and continuously connecting said inlet and outlet ports with the recesses aligned therewith.

6. A fluid pressure energy translating device comprising in combination, a casing having a bearing surface with inlet and outlet ports opening thereto; a cylinder barrel in said casing, the cylinders therein alternately registering with said ports upon relative rotation of said barrel and casing; piston means disposed for reciprocation in said cylinders to transfer fluid from said inlet to said outlet port; means in said casing for imparting reciprocatory movement to said pistons, said means having a thrust member and a bearing member therefor, said bearing member being seated in said casing, said thrust and bearing member having opposed relatively movable engaging surfaces, the contacting surface of said bearing member being provided with recesses; and, fluid conducting means formed in said casing connecting the inlet and outlet ports with said recesses.

7. A fluid pressure energy translating device comprising in combination, a casing having a bearing surface with inlet and outlet ports opening thereto; a cylinder barrel in said casing, the cylinders therein alternately registering with said ports upon relative rotation of said barrel and casing; piston means disposed for reciprocation in said cylinders to transfer fluid from said inlet to said outlet port; means in said casing for imparting a reciprocatory movement to said pistons, said means having a thrust member and a bearing member therefor rigidly supported in said casing, said members having opposed relatively movable engaging surfaces, the surface of said bearing member being formed with recesses; and, fluid conducting means formed in said casing connecting said inlet and outlet ports with certain recesses.

8. A fluid pressure energy translating device comprising in combination, a casing having a bearing surface with inlet and outlet ports opening thereto; a cylinder barrel in said casing, the cylinders therein alternately registering with said ports upon relative rotation of said barrel and casing; piston means disposed for reciprocation in said cylinders to transfer fluid from said inlet to said outlet port; means in said casing for imparting reciprocatory movement to said pistons, said means having a thrust ring and a bearing member therefor, the latter being non-rotatably supported in said casing, said members having opposed relatively movable engaging surfaces, the surface of said bearing member having a recess conforming substantially in shape and size to said outlet port; and, fluid conducting means formed in said casing and continuously connecting said recess and outlet port.

WILLIAM C. DENISON, Jr.

REFERENCES CITED

The following references are of record in the file of this patent:

UNITED STATES PATENTS

| Number | Name | Date |
|---|---|---|
| 1,020,285 | Janney | Mar. 12, 1912 |
| 1,817,080 | Howard | Aug. 4, 1931 |
| 1,822,064 | Sorensen | Sept. 8, 1931 |
| 2,081,477 | Egersdorfer | May 25, 1937 |
| 2,241,701 | Doe | May 13, 1941 |